Dec. 13, 1966 D. J. SAVAGE 3,291,289

NATURAL-FREQUENCY CONVEYOR

Filed April 14, 1965 2 Sheets-Sheet 1

INVENTOR.
DONALD J. SAVAGE
BY *Price & Heneveld*
ATTORNEYS

Dec. 13, 1966 D. J. SAVAGE 3,291,289
NATURAL-FREQUENCY CONVEYOR
Filed April 14, 1965 2 Sheets-Sheet 2
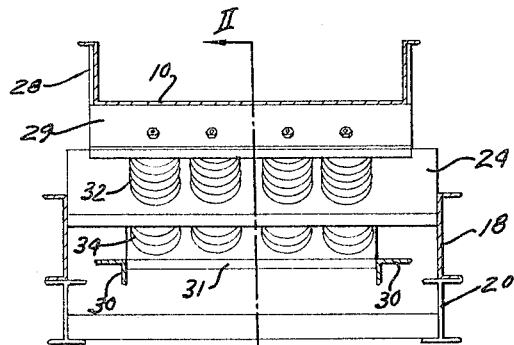
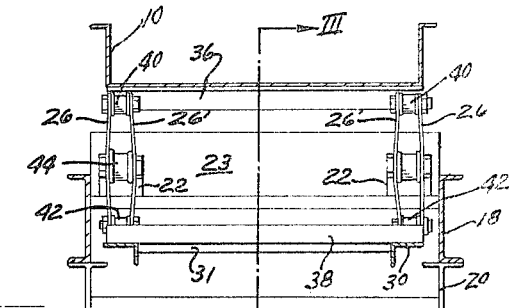
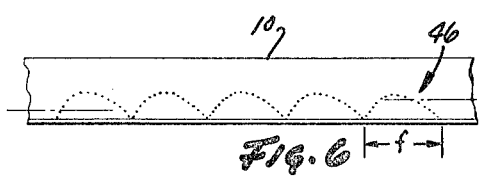
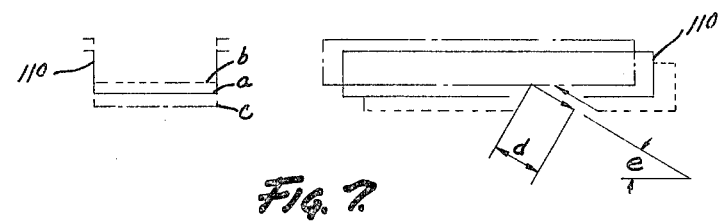
INVENTOR.
DONALD J. SAVAGE
BY
ATTORNEYS United States Patent Office 3,291,289
Patented Dec. 13, 1966

3,291,289
NATURAL-FREQUENCY CONVEYOR
Donald J. Savage, Aurora, Ill., assignor to The Rapids-Standard Company, Inc., Grand Rapids, Mich., a corporation of Michigan
Filed Apr. 14, 1965, Ser. No. 448,153
2 Claims. (Cl. 198—220)

This invention relates to vibrating or natural-frequency conveyors, and more particularly to a unique type of dynamically balanced natural-frequency conveyor having new and desirable attributes.

The basic concept of a natural-frequency conveyor has been known for some time, and conveyors embodying this idea are widely used, particularly for conveying loose particulate matter such as salt, grains, coffee, nuts, flour, and the like. The basic operational concept of these conveyors is the use of a rigid conveyor through which is vibrated at or near the natural frequency of springs which are connected between the trough and a suitable mount. Thus, once vibrations have been initiated, the springs themselves supply most of the energy to the system through their natural harmonic oscillation cycles, and the only additional power needed is to overcome frictional forces to maintain the natural harmonic oscillations. Accordingly, great economy of operation is provided by conveyors of this type since the input power requirements for steady state operation are very small.

The motion involved is harmonic, and consequently the resultant level of vibration transmitted to surrounding structure through the mounting apparatus is distinctly minimal. This characteristic is evidence of a low power demand because it means the absence of wasted energy. When this aspect is considered, along with the great operating economies made possible by these systems and the very efficient manner in which they convey without loss particulate matter normally very difficult to convey at all, the many advantages of these systems become obvious.

The dynamic balancing of natural-frequency conveyors is a further refinement of the basic idea upon which they rest. In dynamically balanced natural-frequency conveyors, a counterweight is added beneath the main conveying trough or pan. The counterweight has the same weight as the trough, and the springs are connected to it instead of to a rigid mount. Also, support arms are connected between the trough and the counterbalance, and these are mounted at their centers to a fixed mounting structure. The counterbalance moves in exact opposition to the vibrating trough, and while the trough is still moved by the naturally-vibrating springs, the vibrations from the conveying system are effectively balanced and therefore isolated from the mounting structure. This has proved to be an even more efficient conveyor than the basic one. It reduces operational costs even further, and the increased smoothness of its operation enables it to be used when supported upon lightweight structures and when used at elevated floor levels, where structural vibration is a distinct problem.

The present invention provides a dynamically-balanced natural-frequency conveyor having an improved design, the structure of which effects a further significant reduction in the level of vibrations transmitted from the conveyor into the mounting structure, due to the improved balance of the system. Consequently, the present conveying system further reduces the input power requirements and therefore provides an even more economical system. The present conveying system reduces the flexing action normally found in the resonating springs, and produces a more complete distribution of the stresses among the various springs. This increases the effective life of the springs while at the same time decreasing the level of the vibrations transmitted through the conveyor mounts. In providing these desirable features, the present balanced conveyor system further reduces unbalanced loading effects which react against the main mechanical drive for the system and against the bearings by which it is pivotally mounted.

The foregoing desirable features and objectives of the present conveying system will become increasingly clear to those skilled in the design and operation of such systems following a consideration of the ensuing specification and its appended claims, especially when taken in conjunction with the accompanying illustrative drawings setting forth a preferred embodiment of the system.

In the Drawings:

FIG. 4 is a transverse sectional view taken through the plane IV—IV of FIG. 1;

FIG. 5 is a transverse sectional view taken through the plane V—V of FIG. 1;

FIG. 6 is a fragmentary, central sectional view of the trough of the conveyor, showing in phantom lines the manner in which articles are conveyed thereupon; and FIG. 7 is a schematic view illustrating the movement of the conveyor trough of FIG. 6, including a force diagram of such movement.

Briefly stated, the present invention provides a natural-frequency conveyor including a conveying trough, a source of mechanical oscillatory vibration connected thereto, a base frame, a dynamic-balancing counter-weight beneath the trough, and rocker arm supports connected at their centers to the base frame, at one end to the trough, and at the other end to the counterbalance, such that the counterbalance and trough are positioned in substantially parallel planes at all times while moving in unison oppositely to each other. The conveyor further includes a plurality of pairs of springs. Each pair of springs is arranged in end-to-end relation with the adjacent ends connected to opposite sides of a rigid central support attached to the base frame. One of the oppositely disposed ends of each of these pairs of springs is connected to the conveyor trough, while the corresponding end of the other spring is connected to the counterweight. Thus, insofar as the springs themselves are concerned, the trough and the counterbalance of the present conveyor are two separate and independent mechanisms. However, these mechanisms are interconnected by rocker arms which coordinate their movements. Thus the mechanisms are made to be interdependent in operation so that the counterweight dynamically balances the movements of the conveyor trough.

Figure 1:
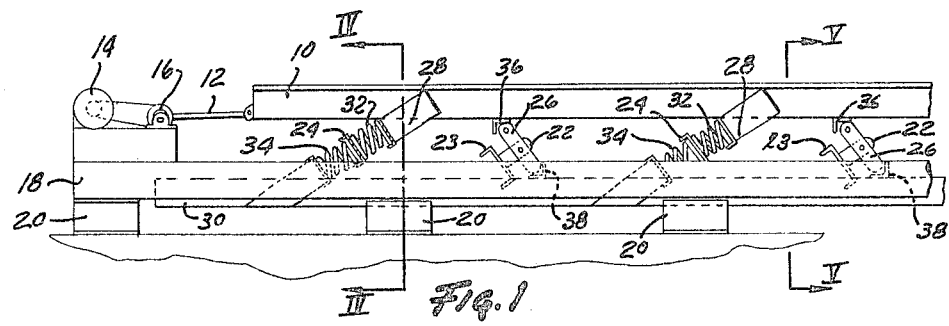
FIG. 1 is a side elevational view of a complete conveyor apparatus of the present invention.

Referring now in more detail to the drawings, in FIG. 1 the conveyor trough is identified by the numeral 10. The trough is connected by a link 12 to a source of mechanical oscillation, preferably provided by an electric or other motor 14 which, by a belt drive, drives shaft 16. The link 12 is eccentrically connected to the shaft 16. The motor 14 and shaft 16 are mounted upon the base frame of the conveyor, which preferably includes a base beam 18 extending throughout the length of the conveyor, and feet or supports 20. The feet serve to support beam 18 a desired distance above ground or floor level, as shown.

Figure 2:
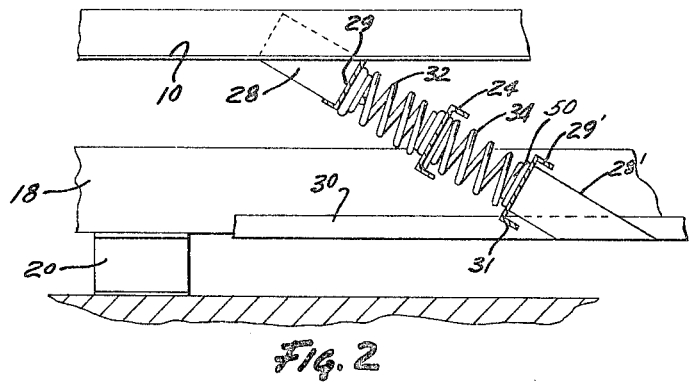
FIG. 2 is a fragmentary sectional view taken through the plane II—II of FIG. 4.

The base frame of the conveyor includes mounting means 22 and 24 (FIGS. 1 and 3) which are rigidly attached to beam 18 at desired equally spaced intervals along its length. The mounts 22 are connected to the base frame by a channel 23 which is rigidly secured to the mounts. Rocker arms 26 are pivotally attached at their centers to each of the mounts 22. These rocker arms are also pivotally attached at their upper ends to the trough 10, by means of a mounting angle structure 36, and at their lower ends to the counterweight 30, by a similar angle 38. Counterweight 30 thus lies parallel to the trough 10. The springs are arranged in pairs with each pair consisting of a spring 32 and a spring 34. Each of the springs 32 and 34 of each pair is attached at one end to a fixed channel 24 (FIGS. 1 and 2). The springs of each pair are arranged linearly and coaxially of each other. The other end of each of the springs 32 is rigidly connected to the trough 10 by a channel 29 and a reinforcing rib 28. The other end of each of the springs 34 is connected to the counterweight 30 by a similar channel 29' and reinforcing rib 28'. The pairs of springs 32 and 34 are arranged in groups crosswise of the conveyor, as is shown in FIG. 4.

The position and manner of mounting each of the pairs of springs 32 and 34 is shown in detail in FIGS. 2 and 4. In FIG. 2, a preferred mounting means 24, to which the adjacent ends of each of the springs 32 and 34 are connected, is seen to be a generally U-shaped channel member. This channel 24 is rigidly connected at each end to the base frame beams 18 (FIG. 4). Consequently, mount 24 is a rigid member, and the attached ends of springs 32 and 34 in each pair are therefore securely fixed in the position shown. The reinforcing ribs 28 noted previously are seen in FIGS. 2 and 4 to include a bracket plate attached to the sides of the trough 10 and a transverse channel section 29, which preferably is integral with the bracket and extends across the width of the conveyor trough (FIG. 4).

The upper end of each spring 32 is attached to channel section 29 in a fixed and secure manner, as by bolting. The lower end of each of the springs 34 is connected to the counterbalance 30, by a similar bracket means 28' (FIG. 2) having a similar transverse channel section 29' attached thereto. Both ends of each spring are held against displacement by suitable blocks 50 which extend a short distance into the ends of the springs.

Figure 3:
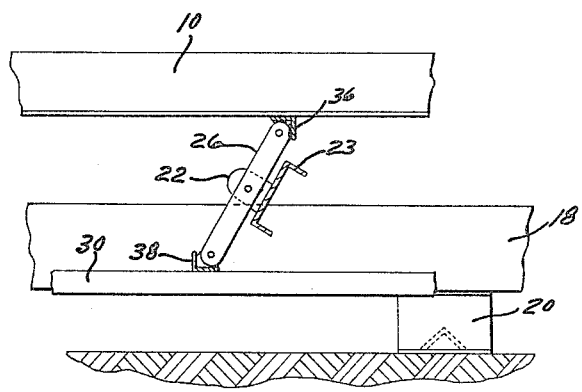
FIG. 3 is a fragmentary sectional view taken through the plane III—III of FIG. 5.

The rocker arms 26 and the mounting of these arms is shown in detail in FIGS. 3 and 5. It is here seen that a transverse angle section 36 is affixed to the underside of the conveyor trough 10. A similar angle section 38 is affixed across the top of the counterweight 30. Angle sections 36 and 38 support trunions 40 and 42, respectively, at each side of the trough and counterbalance (FIG. 5). The mounts 22 affixed to channel 23 secure the rocker arms to beam 18 of the base frame. Each of the rocker arms is pivotally secured to the mounts by the center trunion 44, one adjacent each side of the trough. A pair of identical rocker arms 26 and 26' are mounted to each of the angle sections 36 and 38. These attach at their top end to trunion 40, at their bottom end to trunion 42, and at their centers to trunion 44. The trunions provide torsional bushings for the rocker arms, and consequently the latter are pivotally connected at the three points noted. Each pair of rocker arms 26 and 26' may rotate in either direction about the center trunions 44. When this occurs, the trough 10 and counterbalance 30 will move through opposite arcuate paths while remaining parallel to each other.

In operation, movement of the conveyor structure herein disclosed is as follows. Oscillatory mechanical vibrations are supplied from motor 14 and eccentric 16 through link 12 to the trough 10. As has been stated, the trough not only moves backward and forward horizontally, but since it is pivotally mounted upon rocker arms of a fixed length, the trough moves in an arcuate path which combines both horizontal and vertical motion. Its vertical motion is illustrated at the left in FIG. 7, wherein an illustrative trough 110 is depicted as rising from a normal level $a$ to a new level $b$, and falling to a new lower level $c$.

The total stroke of the rocker arms normally is quite short, and does not ordinarily exceed an angular distance of one inch. Consequently, the actual degree of curvature of the path traversed by the trough is very slight, and this path may be represented as being an inclined straight line. This is shown in FIG. 7 at the right, wherein three successive positions of the trough 110 are illustrated which correspond to levels $a$, $b$, and $c$ at the left. The length of stroke (i.e., the distance between the uppermost and lowermost extremes of the trough) is shown by the dimension $d$, while the angle of inclination which the trough follows is shown by the dimension $e$.

Repeated cycles of the movement of the conveyor trough which has been described caused the movement of objects upon the upper surface of the trough in the manner illustrated in FIG. 6. That is, as the trough moves from its normal position $a$ upward and forward to position $b$, objects 46 upon the trough 10 are given a corresponding motion and undergo an increasing acceleration. When the trough suddenly reverses its motion at the end of a stroke and moves backward and downward from position $a$ to position $c$, the particles or objects 46 leave the surface of the trough 10 and then fall downward to a different point on the surface. This new point is a distance $f$ ahead of where the object previously rested. Thus, as the trough is repeatedly oscillated or vibrated in this manner, the objects 46 are continuously "jumped" or "tossed" steadily along the surface of the trough in a gentle, wave-like forward motion.

The movement imparted to the trough 10 through the link 12 from the driving mechanism is also imparted to the counterbalance 30 through operation of the various rocker arms 26. That is, (referring to FIG. 1) when the trough moves upwardly and to the right, the counterbalance moves downwardly and to the left, away from the trough. Similarly, when the trough moves downwardly and to the left, the counterbalance moves upwardly and to the right, towards the trough. Since the springs 32 and 34 are rigidly attached to the mounting member 24, when the rocker arms are pivoted toward the vertical, the springs will be placed in tension due to the loading upon them of the trough and the counterbalance. When the rocker arms are pivoted in the opposite direction beyond their neutral position, the same springs will be placed in compression, for the same reasons. It will thus be seen that for each complete cycle of mechanical oscillation imparted to the trough by the drive means, each of the sets of springs undergoes a cycle of lengthening by tension forces and shortening by compressive forces.

This alternating stretching and compressing of each of the springs occurs in a fixed rhythmic cycle determined by the frequency of the mechanical vibrations supplied to this system. This frequency is preferably the resonant or natural frequency of each of the identical springs in the system. This is the optimum operating condition of such a conveyor, since the springs tend to freely continue their natural vibrations at this frequency. Thus, once they have originally been put in motion, the springs themselves supply most of the energy required to move the trough in its repeated cycle, and only the frictional losses in the system which tend to diminish and end the natural vibrations must be replaced by the motor and eccentric drive. This is very much less than the power required to initially start the conveyor and place it in operation.

By having a pair of separate springs 32 and 34 operating against the rigid and unyielding mount 24, the natural-frequency conveyor of the present invention actually operates as two synchronized resonant mechanical systems. That is, springs 32 and the trough 10 constitute one system, and springs 34 and counterbalance 30 constitute another system. In order to operate properly, each of the systems should of course have the same natural frequency of vibration. This is, generally speaking, determined both by the weight of the trough and the counterbalance in loading their particular springs, and the basic geometry of the springs themselves. Consequently, although the counterbalance 30 is normally selected to have the same weight as the conveyor trough 10, so that the springs 32 and 34 are identical, this is not necessarily the case so long as the natural frequencies of the two systems are the same.

The synchronized independent systems of the present conveying mechanism serve to smooth considerably the overall operation of the conveyor by more perfectly balancing the many vibrational components that exist in such a system. The vibrations thus transmitted through the mounts into the surrounding environment are of a much lower magnitude than those of previous similar systems. This in itself insures longer life for the system, and also makes it possible to use the present natural-frequency conveyor in installations which would be too unsteady or precarious for similar types of conveyors of a different construction. Moreover, each of the springs individually receives less stress than the springs of other like conveyors. This result is due to their smaller size, and also due to the fact that they are driven much more uniformly and consistently. Thus, not only do the springs themselves enjoy a longer useable life span, but they drive the trough and counterbalance at a rate that is more nearly their exact natural frequency, resulting in significantly decreased levels of required operating power.

Upon having thoroughly considered the foregoing specification and having gained an appreciation of the spirit of the invention disclosed therein, those skilled in the vibration conveyor art may subsequently devise certain modifications and alterations in structure and in form which nonetheless are based upon the inventive concept underlying the embodiment disclosed herein. All such modifications and variations are to be considered as a part of this invention and included within its scope, unless the following claims by their language expressly state otherwise.

I claim:
1. A dynamically-balanced natural-frequency conveyor, having a trough portion having a predetermined and known weight for holding the objects to be conveyed, a base mounting frame, a counterbalance having a predetermined and known weight, and a plurality of rocker arm support, each of said arms being pivotally connected at its center to said base frame and pivotally connected at opposite ends to said trough and said counterbalance, respectively, the improvement in said conveyor comprising: a first set of spring means connected at one end to said trough and at the other end to said base frame; said first spring means and the said weight of the trough establishing a first natural frequency of vibration thereof; and a second set of spring means connected at one end to said counterbalance and at the other end to said base frame; said second spring means and the said weight of the counterbalance establishing a second natural-frequency of vibration; said first and second spring means being aligned with the connection thereof to said base frame being between the adjacent ends of said first and second spring means, causing all of said spring means to be alternately simultaneously compressed and simultaneously extended; said trough, said counterbalance and said first and second sets of spring means being selected to make said first and second natural frequencies substantially equal to each other.

2. The natural-frequency conveyor of claim 1, wherein a plurality of mounting members are rigidly mounted to said base frame, each extending transversely of said conveyor midway between said trough and said counterbalance; said first and second spring means being arranged in groups, with the ends of said first spring means connected to one face of said mounting members and the ends of said second spring means connected to the opposite face of said mounting members.

References Cited by the Examiner
UNITED STATES PATENTS
1,495,850    5/1924    Jacquelin _____ 198—200

References Cited by the Applicant
UNITED STATES PATENTS
2,664,995    1/1954    Renner.

EVON C. BLUNK, *Primary Examiner.*
RICHARD E. AEGERTER, *Examiner.*